(12) United States Patent
No

(10) Patent No.: US 8,905,213 B2
(45) Date of Patent: Dec. 9, 2014

(54) PRESSURE MOUNTING SLIP COUPLING

(75) Inventor: Chang Hwan No, Busan (KR)

(73) Assignee: Nara Corporation, Busan (KR)

( * ) Notice: Subject to any disclaimer, the term of this patent is extended or adjusted under 35 U.S.C. 154(b) by 162 days.

(21) Appl. No.: 13/509,021

(22) PCT Filed: Jan. 19, 2011

(86) PCT No.: PCT/KR2011/000381
§ 371 (c)(1),
(2), (4) Date: May 10, 2012

(87) PCT Pub. No.: WO2011/115363
PCT Pub. Date: Sep. 22, 2011

(65) Prior Publication Data
US 2012/0228075 A1 Sep. 13, 2012

(51) Int. Cl.
*F16D 7/02* (2006.01)
*F16D 25/0632* (2006.01)

(52) U.S. Cl.
CPC ............ *F16D 7/028* (2013.01); *F16D 25/0632* (2013.01)
USPC .......................... 192/56.3; 192/113.4; 464/42

(58) Field of Classification Search
CPC ....................................................... F16D 1/091
USPC ................ 192/56.3, 56.31, 113.4; 464/42, 10
See application file for complete search history.

(56) References Cited

U.S. PATENT DOCUMENTS

| | | | | |
|---|---|---|---|---|
| 2,158,182 A | * | 5/1939 | Goddard | 403/337 |
| 4,407,602 A | | 10/1983 | Terry, Jr. | |
| 4,616,948 A | * | 10/1986 | Jelfs | 403/5 |
| 4,995,493 A | | 2/1991 | Cotsman et al. | |
| 6,378,679 B1 | * | 4/2002 | Karjalainen et al. | 192/56.31 |

FOREIGN PATENT DOCUMENTS

| | | |
|---|---|---|
| EP | 2 050 975 A1 * | 4/2009 |
| JP | 61-238592 | 10/1986 |
| KR | 20-0198198 | 10/2000 |
| KR | 10-2008-0108583 | 12/2008 |

OTHER PUBLICATIONS

International Search Report for PCT/KR2011/000381 mailed Sep. 30, 2011.

* cited by examiner

*Primary Examiner* — Rodney H Bonck
(74) *Attorney, Agent, or Firm* — AKC Patents, LLC; Aliki K. Collins

(57) ABSTRACT

The present invention relates to a pressure mounting slip coupling, wherein it is possible to transmit power in spite of an eccentricity or a declination generated in the axial direction, block a torque overload, flexibly correspond to the change of the distance between shafts, and improve durability and operation stability with an insulation function. The pressure mounting slip coupling (1) has one side flange (11) coupled with a brake disc (2), which is connected to the output shaft (O) of a motor, and another side flange (12) coupled with a flange (3), which is connected to the input shaft (I) of an object to be driven, so that the output shaft (O) of the motor and the input shaft (I) of the object to be driven are connected to each other. In the pressure mounting slip coupling (1), the flange (11) is formed on a spacer (41) at one side of an intermediate shaft (4), so that the flange (11) is coupled with the brake disc (2), which is connected to the output shaft (O) of the motor, via an insulating section (5) therebetween. In addition, a boss (42) at the other side of the intermediate shaft (4) is provided with an overload-prevention section (6) and formed with the flange (12), so that the flange (12) may be coupled with the flange (3), which is connected to the input shaft (I) of the object to be driven.

1 Claim, 5 Drawing Sheets

PRESSURE MOUNTING SLIP COUPLING

RELATED APPLICATIONS

This application is a 371 application of International Application No. PCT/KR2011/000381, filed Jan. 19, 2011, which in turn claims priority from Korean Patent Application No. 10-2010-0022699, filed Mar. 15, 2010, each of which is which is incorporated herein by reference in its entirety.

TECHNICAL FIELD

The present invention relates to a pressure mounting slip coupling, and in particular to a pressure mounting slip coupling (a coupling with an over load prevention means which is assembled and disassembled using a hydraulic) which makes it possible to transfer a driving force even when an axial eccentricity or declination occurs and to interrupt an over load with respect to a force exceeding a set torque and to flexibly cope with a change in a distance between shafts, the pressure mounting slip coupling having a heat insulation function.

BACKGROUND ART

Generally, a coupling is directed to transferring a driving force between a prime mover and a driven device and to performing a driving force transfer while protecting both shafts even when there is displacement (eccentricity, declination, axial movement displacement) between a shaft of a prime mover and a shaft of a driven device.

When an over load occurs at either a driven device or a prime mover, since an over load is directly transferred, it might damage a driven device or a prime mover. In order to prevent such damages, a coupling is being improved.

Korean utility model publication number 20-2000-0006952 discloses a coupling unit which comprises a power lock assembly disposed at the inner diameter parts of first and second flanges installed at two different shafts and fixed at the shafts with transfer torques defined by means of the first and second flanges coming into contact with a circumferential surrounding portion with the aid of a surface pressure, a friction plate and a bushing which are disposed between the first and second flanges, and a bolt and a nut which connect the first and second flanges by way of the friction plate and the bushing, by means of which construction the displacement and declination in an axial direction can be compensated, and when a force exceeding a set transfer torque is transferred to the shaft, the shaft slips at the power lock assembly, thus offsetting the torque exceeding a set level as the shaft slips at the power lock assembly when the force exceeding a set transfer torque is transferred to the shaft, thus consequently preventing the shaft and other elements from damages.

Korean patent publication number 10-1998-0001744 discloses an electrically insulated coupling which comprises an outer hub in which there are provided two facing coupling members connecting two rotating shafts and disposed at each shaft, and an inner hub is coupled to each shaft in at least one coupling member between the two coupling members, with the outer hub being mounted at the concentric shaft of the inner hub and being connected with the opposite coupling member, an electrically insulated part disposed between the contact surfaces between the inner and outer hubs for thereby electrically insulating the hubs, and a second hollow key disposed a contract surface between the inner and outer hubs in an electrical insulation way.

DISCLOSURE OF INVENTION

Accordingly, it is an object of the present invention to provide a coupling which is connected between a prime mover and a driven device, thus transferring a driving force, the coupling being capable of providing a protection of a variety of elements such a shaft or something and their operation stabilities in such a way to interrupt an over load so that a force exceeding a set torque is not transferred.

Even when a shaft of a prime mover and a shaft of a driven device are matched at the parallel same shafts, an eccentricity and declination inevitably occur in an axial direction, so the present invention is directed to transferring a driving force to an eccentricity and declination in an axial direction.

In addition, the present invention provide an electric insulation function which can prevent possible error problems by interrupting an electric conduction which might come from a prime mover or a driven device.

A distance between an input shaft and an output shaft might vary depending on a repair, exchange, etc. of a prime mover or a driven device. The present invention is directed to flexibly coping with the early mentioned distance variation between two shafts.

The present invention is directed to providing an over load prevention means preventing a force exceeding set torque from being transferred.

Technical Problem

According to this invention, there is provided a pressure mounting slip coupling in which a flange of one side is coupled to an output shaft of a prime mover, and a flange of the other side is coupled to a flange connected to an input shaft of a driven device, so the output shaft of the prime mover and the input shaft of the driven device are connected with each other, comprising a flange which is coupled by interposing an insulated part between the flange and a spacer of one side by forming a flange at the spacer of one side of an intermediate shaft; and an over load prevention part disposed at a boss of the other side of the intermediate shaft, so the flange is formed and coupled with the flange connected to the input shaft of the driven device.

According to this invention, the over load prevention part is characterized in that an inner sleeve with a taper surface at its outer surface is coupled to an outer side of the boss, and an outer sleeve with a taper surface at its inner surface corresponding to the taper surface of the inner sleeve is coupled to an outer side of the inner sleeve, and an outer surface of the inner sleeve comes into contact with an inner side of the outer sleeve, and an inner diameter of the outer sleeve is expanded by supplying pressure oil into the interior, and the outer sleeve is pushed, thus providing an engaging force to the taper surfaces of the inner sleeve and the outer sleeve, and when an over to load exceeding an engaging force of each of the taper surfaces occurs, a slip occurs between the inner sleeve and the bushing.

According to this invention, the cylinder is characterized in that a nut cap having a sealing is coupled to the inner sides of the inner sleeve and the outer sleeve, thus sealing a cylinder, and the nut cap sealing the cylinder is fixed at the inner sleeve, so the pressure of the cylinder is applied to the outer sleeve.

According to this invention, a spiral flow passage is formed at the outer sleeve, thus applying a pressure from an inner surface by supplying a pressure oil to the taper surface of the inner sleeve for a separation from the inner sleeve, and the pressure of the pressure oil is applied along the flow passage and is applied to an inner surface of the outer sleeve, thus separating the outer sleeve from the inner sleeve.

According to this invention, an insulation plate is interposed between the spacer and the flange, and a bolt connecting the spacer and the flange is coupled with the insulation bush, and the nut coupled with the bolt is coupled by interposing the insulation plate.

Advantageous effects

The present invention is directed to transferring a driving force even when an eccentricity and a declination occur between an output shaft of a prime mover and an input shaft of a driven device and to preventing a damage, error, etc. of a variety of elements of a prime mover, a driven device, etc. by interrupting an over load so that a force exceeding a set torque does not transfer to an opponent shaft, and it is possible to stably connect a shaft even when there is a variation in a distance between an input shaft and an output shaft and an insulation function is provided in the present invention, so it is possible to extend a service life and to enhance a stable operation and a durability of a facility (for example, a wind power plant) which needs an insulation.

In particular, the present invention is directed to providing an efficient and precise over load interruption function by precisely setting and adjusting an over load interruption.

| O: output shaft | I: input shaft |
|---|---|
| 1: coupling | 11, 12: flanges |
| 2: brake disc | 3: flange |
| 4: intermediate shaft (Pipe) | 41: spacer |
| 42: boss | 43: bushing |
| 5: insulated part | 61: inner sleeve |
| 6: over load prevention part | 61: inner sleeve |
| 62: outer sleeve | 61a, 62a: taper surface |
| 63: cylinder | 64: nut cap |
| 65: sealing | 66: port |
| 7: bolt | 71: nut |
| 8: flow passage | 81: port |
| 9, 9': element | |

BEST MODES FOR CARRYING OUT THE INVENTION

The detailed embodiments of the present invention will be described with reference to the accompanying drawings.

Figure 1:
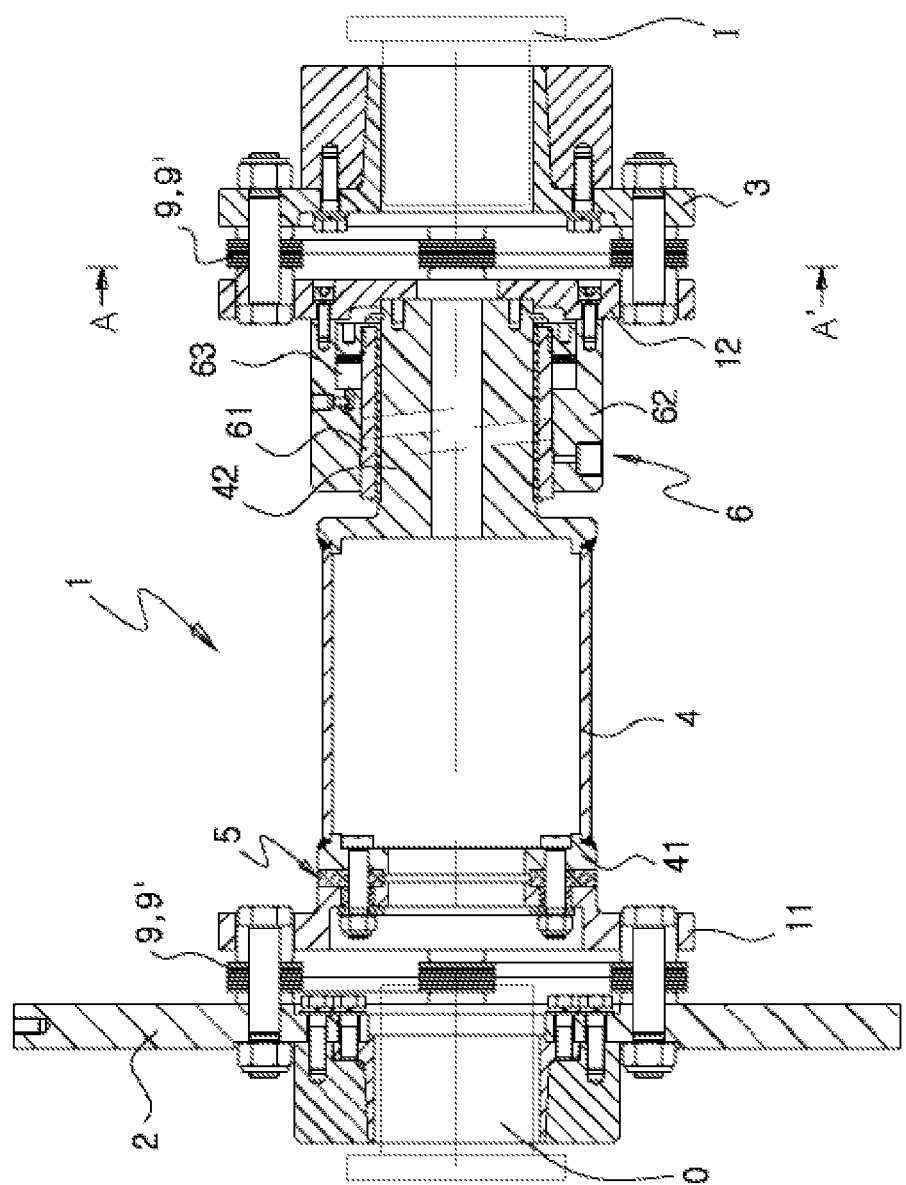
FIG. 1 is a cross sectional view illustrating an embodiment of the present invention.
Figure 2:
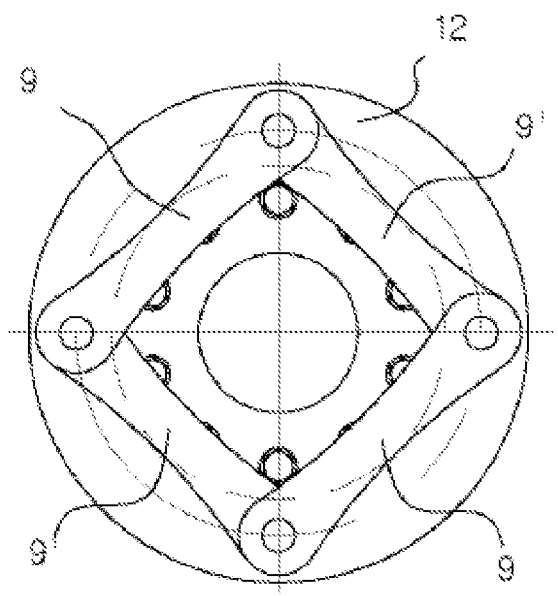
FIG. 2 is a cross sectional view taken along line A-A' of FIG. 1.
Figure 3:
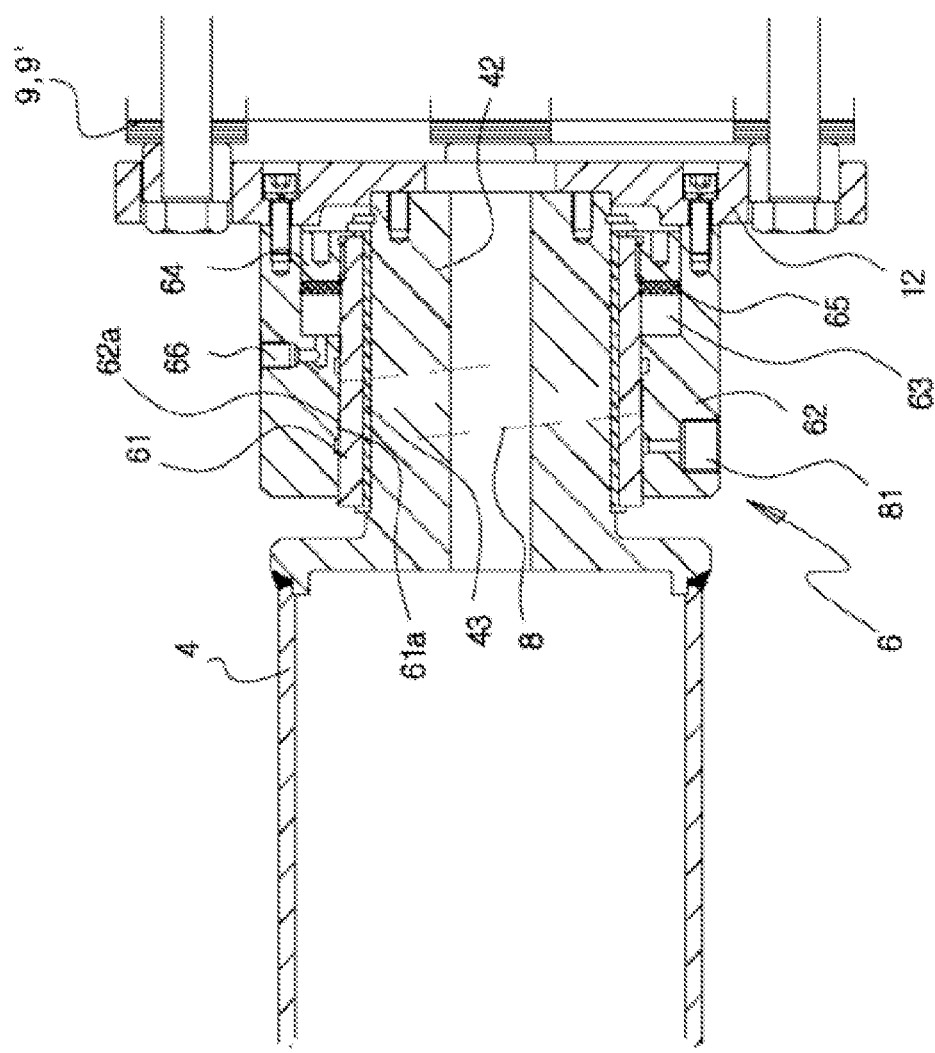
FIG. 3 is a cross sectional view illustrating an over load protection part according to the present invention.
Figure 4:
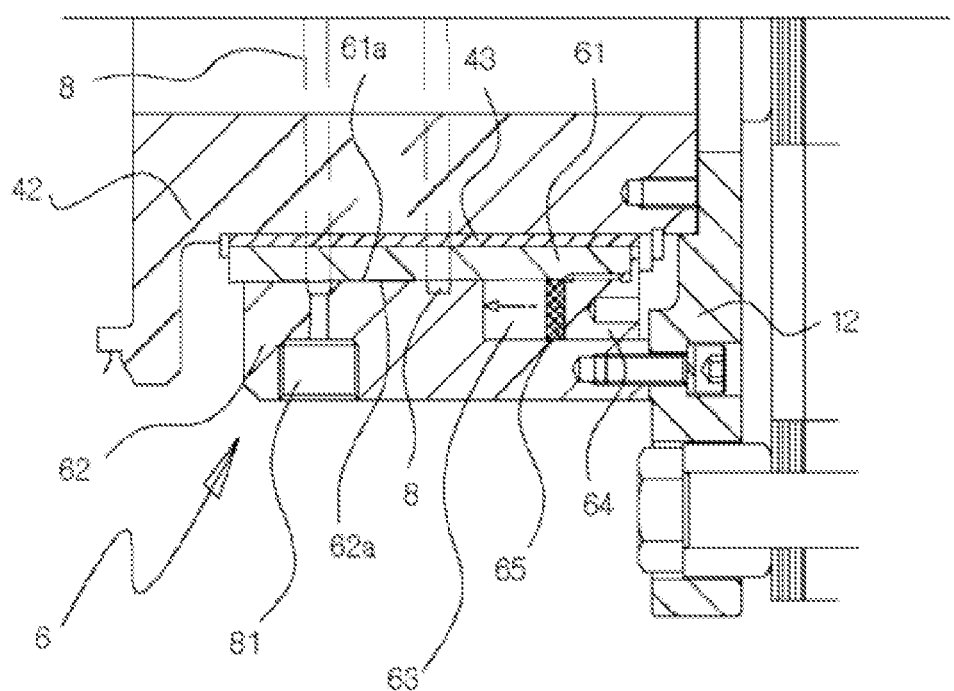
FIG. 4 is an enlarged cross sectional view illustrating part of an over load protection part according to the present invention.
Figure 5:
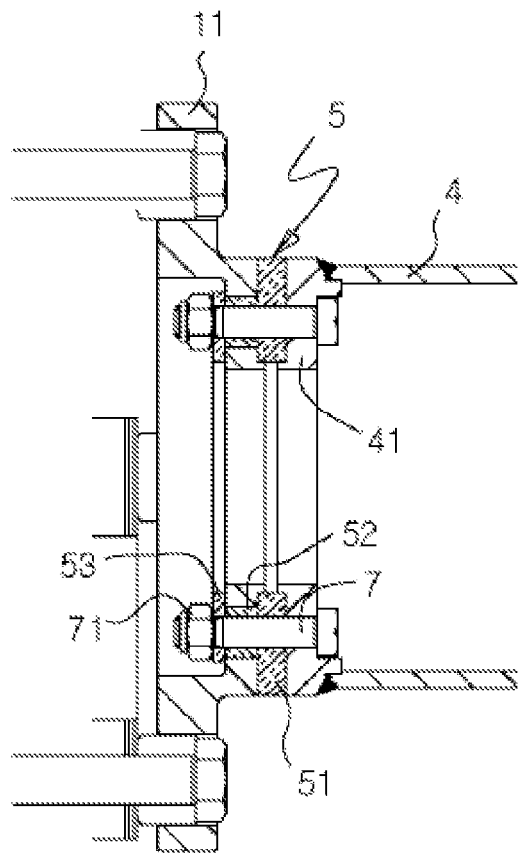
FIG. 5 is an enlarged cross sectional view illustrating part of an insulated part according to the present invention.

FIG. 1 is a cross sectional view illustrating an embodiment of the present invention. FIG. 2 is a cross sectional view taken along line A-A' of FIG. 1. FIG. 3 is a cross sectional view illustrating an over load protection part according to the present invention. FIG. 4 is an enlarged cross sectional view illustrating part of an over load protection part according to the present invention. FIG. 5 is an enlarged cross sectional view illustrating part of an insulated part according to the present invention.

An output shaft O of a prime mover and an input shaft I of a driven device are connected with each other by way of a coupling 1.

The coupling 1 is characterized in that flanges 11 and 12 are formed at both sides of an intermediate shaft 4, so an output shaft O of the prime mover and an input shaft I of the driven device are connected with each other. The flange 11 of one side is coupled to a brake disc 2 connected with the output shaft O of the prime mover by way of an engaging bolt and a nut. The flange 12 of the other side is coupled with the flange 3 connected to the input shaft I of the driven device by way of an engaging bolt and a nut.

The coupling 1 according to the present invention is characterized in to that a spacer 41 and a boss 42 are formed at both sides of an intermediate shaft 4, and an insulated part 5 and an over load prevention part 6 are provided, respectively.

A spacer 41 is formed at the output shaft O of the side of the prime mover of the intermediate shaft 4, and a flange 11 is formed at the same and is coupled with the brake 2 connected with the output shaft O of the prime mover with the insulated part 5 being interposed, by way of an engaging bolt and a nut.

The insulated part 5 interposes the insulated plate 51 between the spacer 41 and the flange 11, and the bolt 7 connecting the spacer 41 and the flange 11 is coupled to the insulated bush 52, and the nut 71 coupled to the bolt 7 is coupled by interposing the insulated plate 53, so the flange 11 connected with the spacer 41 of the intermediate shaft 4 and the output shaft O of the prime mover is connected with the insulated plates 51 and 53 and the insulated bush 52, thus performing insulation.

An over load prevention part 6 is formed at the boss 42 formed at the input shaft I of the driven device of the intermediate shaft 4, and the flange 12 is formed at the same and is coupled to the flange 3 connected to the input shaft I of the side of the driven device by way of an engaging bolt and a nut.

The over load prevention part 6 is characterized in that the flange 12 is formed at the side of the input shaft I of the boss 42 of one side of the intermediate shaft 4 and is coupled with the flange 3 connected with the input shaft I, by way of an engaging bolt and a nut.

An inner sleeve 61 having a taper surface 61a at its outer surface is coupled with the bushing 43 at an outer side of the boss 42, and an inner surface is formed of a sloped taper surface 62a while corresponding to the taper surface 61a of the inner sleeve 61 at the outer side of the inner sleeve 61, thus coupling the outer sleeve 62 inserted into the taper surface 61a of the outer side of the inner sleeve 61.

A cylinder 63 coming into contact with the taper surface 61a of the inner sleeve 61 is formed at an inner side of the outer sleeve 62. The cylinder 63 is characterized in that the nut cap 64 having a sealing 65 is coupled to the inner sides of the inner sleeve 61 and the outer sleeve 62, thus forming a sealed cylinder 63, and the nut cap 64 sealing the cylinder 63 is fixed at the inner sleeve 61, so the pressure of the cylinder 63 is applied to the outer sleeve 62 for its movement.

The operation of the outer sleeve 62 will be described later.

A port 66 and a port 81 are formed at the cylinder 63 of the outer sleeve 62 so as to externally supply pressure oil. The inner diameter of the outer sleeve 62 can be expanded by supplying pressure oil from the port 81, and another pressure oil coming from the other port 66 is supplied to the cylinder 63 formed at an outer surface of the outer sleeve 62, so the outer sleeve 62 can move a set distance along the taper surface 61a of the inner sleeve 61, and then the pressure oil of the port 81 is removed, and then the pressure oil of the other port 66 is removed.

As the pressure oil is removed, the outer sleeve 62 has a contraction force owing to an elastic force, and a tight tightening force occurs between the inner sleeve 61, the bushing 43 and the boss 42 with the aid of the earlier mentioned contraction force, and at this time a friction force and a friction torque with respect to the tightening force occurs between the bushing 43 and the inner surface of the inner sleeve 61.

When torque over the friction torque is transferred to the coupling, slip occurs between the bushing 43 and the inner sleeve 61, thus not transferring overload.

The inner sleeve 61 and the outer sleeve 62 have taper surfaces 61a and 62a at their outer and inner surfaces with their diameters being larger in the direction of the output shaft O of the prime mover and their diameters being smaller in the direction their opposite directions (input shaft of the driven device), and the outer sleeve 62 coupled to the outer side of the fixed inner sleeve 61 moves in the direction that the diameters are larger, thus increasing the coupling force, and when it moves in the opposite direction (the diameter is smaller), so the coupling force decreases.

Namely, the inner diameter of the outer sleeve 62 is expanded by means of the pressure of the pressure oil supplied to the taper surface 62a of the outer sleeve 62, and the outer sleeve 62 moves by means of the pressure oil inputted into the cylinder 63, thus more strongly coupling the inner sleeve 61. As a strong coupling force is applied to the taper surfaces 61a and 62a between the inner sleeve 61 and the outer sleeve 62, the pressure is applied to the inner diameter portion of the inner sleeve 61, so a coupling force is applied to a junction surface between the inner diameter of the inner sleeve 61 and the boss 42, in details, to a junction surface between the inner diameter of the inner sleeve 61 and the bushing 43 of the boss 42, thus transferring a driving force.

The method of expanding the inner diameter of the outer sleeve 62 with the aid of the pressure oil coming from the port 81 will be described in more details when describing the method of separating the outer sleeve 62 and the inner sleeve 61.

When a load exceeding a set torque occurs owing to a coupling force applied to the taper surfaces 61a and 62a between the inner sleeve 61 and the outer sleeve 62 for the transfer of a driving force (when the load is above the tight coupling force between the inner sleeve 61 and the outer sleeve 62), slip occurs between the inner sleeve 61 and the boss 42 coupled with the bushing 43, thus interrupting the transfer of the over load, so the precision of the overload interruption can be enhanced, and the damages or errors of the elements such as a shaft or something can be prevented, and as an oil film is formed at the taper surfaces 61a and 62a, thus preventing scratches or damages.

The outer sleeve 62 has a flow passage 8 helping apply a pressure at an inner surface is formed in such a way to supply pressure oil to the taper surface 62a of the outer sleeve 62 for a separation from the inner sleeve 61. The flow passage 8 has a port 81 supplying pressure oil from the outer side of the outer sleeve 62 at a side where the diameter is larger, and the flow passage 8 communicating with the port 81 is formed in a spiral shape from the portion with a larger diameter to the portion with a smaller diameter, so the pressure of the externally supplied pressure oil flows along the flow passage 8 and is applied to the outer surface of the inner sleeve 61, thus expanding the inner diameter of the outer sleeve 62, and the diameter of the taper surface 62a of the outer sleeve 62 is pushed in the direction that the diameter is smaller, so the inner sleeve 61 and the outer sleeve 62 are separated from each other.

The both ends of the flow passage 8 are closed, and the pressure oil injected into the flow passage 8 applies a pressure in the directions from an inner surface of the outer sleeve 62 to an outer surface of the inner sleeve 61 to by way of the flow passage 8, thus pushing the portions between the outer sleeve 62 and the inner sleeve 61 while causing a slip, so the outer sleeve 62 and the inner sleeve 61 are separated from each other. The flow passage 8 formed at the inner surface of the outer sleeve 62 can be implemented in various shapes.

Figure 6:
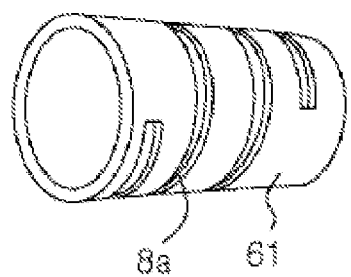
FIG. 6 is a perspective view according to another embodiment of the present invention.

The flow passage 8 that is connected with the port 81 of the outer sleeve 62 for thereby allowing the taper surfaces 61a and 62a of the inner sleeve 61 and the outer sleeve 62 to slip and be separated might be implemented by forming a flow passage 8a at the outer surface of the outer sleeve 62 as well as the inner sleeve 61 as shown in FIG. 6.

Both the flanges 11 and 12 are coupled with an engaging bolt and a nut by stacking and coupling the brake disc 2, the flange 3 and a couple of the elements 9 and 9' as shown in FIG. 2.

The couple of the elements 9 and 9' are formed of a thin steel plate or something and are stacked between both the flanges 11 and 12, the brake disc 2 and the flange 3, thus transferring a driving force even when the eccentricity and declination occur between two shafts. It is possible to flexibly cope with any variations in terms of the distance between the output shaft O and the input shaft I, thus stably connecting both shafts.

Modes For Carrying Out The Invention

The present invention is directed to a pressure mounting slip coupling which is characterized in that when configuring a coupling which connects an output shaft of a prime mover and an input shaft of a driven device, it is possible to transfer a driving force even when there are eccentricity and declination in an axial direction for a connection between shafts. An over load can be interrupted so that a force exceeding a set torque is not transferred to an opponent shaft. It is possible to flexibly cope with a variation in a distance between an input shaft and an output shaft while obtaining an insulation function.

The present invention is directed to providing a coupling which is characterized in that an over load prevention part and an insulated part are formed at both sides of a coupling, and a flange is formed at both sides connecting an output shaft of a prime mover and an input shaft of a driven device and is connected to the output shaft and the input shaft, respectively. A plurality of elements are provided between the flanges connected with the output shaft and the input shaft, thus transferring a driving force even when an eccentricity and declination occur and thus flexibly coping with a variation in a distance between the shafts.

Industrial Applicability

The present invention is directed to interrupting an over load with respect to a force exceeding a set torque while transferring a driving force even when an eccentricity and declination occur in an axial direction. A variation in a distance between shafts can be flexibly handled, and there is an insulation function, so durability and operation stabilization can be obtained. Since the coupling according to the present invention is capable of interrupting an over load while transferring a driving force and has an insulation function, it can be well applied to a variety of industrial fields.

The invention claimed is:

1. A pressure mounting slip coupling in which a first flange (11) of one side is coupled to a brake disc (2) connected to an output shaft (O) of a prime mover, and a second flange (12) of the other side is coupled to a third flange (3) connected to an input shaft (I) of a driven device, so the output shaft (O) of the prime mover and the input shaft (I) of the driven device are connected with each other, comprising:

a coupling (1) which is coupled by interposing an insulated part (5) between the first flange (11) and a spacer (41) of one side by forming the first flange (11) at the spacer (41) of one end of an intermediate shaft (4); and an overload prevention part (6) disposed at a boss (42) of the other end of the intermediate shaft (4) and coupled with the third flange (3), that is connected to the input shaft (I) of the driven device, by the second flange (12);

wherein said over load, prevention part (6) is characterized in that an inner sleeve (61) with a first taper surface (61a) at its outer surface is coupled to an outer side of the boss (42), a second taper surface (62a) corresponding to the taper surface (61a) of the inner sleeve (61) is formed to an inner side of an outer sleeve (62), a cylinder (63) being in contact with the first taper surface (61a) of the inner sleeve (61) is connected with the second flange (12) of the input shaft (I), an outer surface of the inner sleeve (61) comes into contact with an inner side of the outer sleeve (62), an inner diameter of the outer sleeve (62), is expanded by supplying pressure oil into the interior of the outer sleeve (62), and thus) providing an engaging force to the first and second taper surfaces (61a,62a) of the inner sleeve (61) and the outer sleeve (62), respectively, by pushing the outer sleeve (62), when an overload exceeding an engaging force of each of the first and second taper surfaces (61a,62a) occurs, a slip occurs between the inner sleeve (61) and a bushing (43);

wherein the cylinder (63) is characterized in that the cylinder (63) is sealed by coupling a nut cap (64) having a sealing (65) to the inner sides of the inner sleeve (61) and the outer sleeve (62), and the nut cap (64) sealing the cylinder (63) is fixed at the inner sleeve (61) to apply the pressure of the cylinder (63) to the outer sleeve (62);

wherein a first insulation plate (51) is interposed between the spacer (41) and the first flange (11), a bolt (7) connecting the spacer (41) and the first flange (11) is coupled with an insulation bush (52), and a nut (71) coupled with the bolt (7) is coupled by interposing a second insulation plate (53).

* * * * *